C. W. GIFT.
MECHANICAL MOVEMENT.
APPLICATION FILED MAY 6, 1913.
1,105,418.
Patented July 28, 1914.
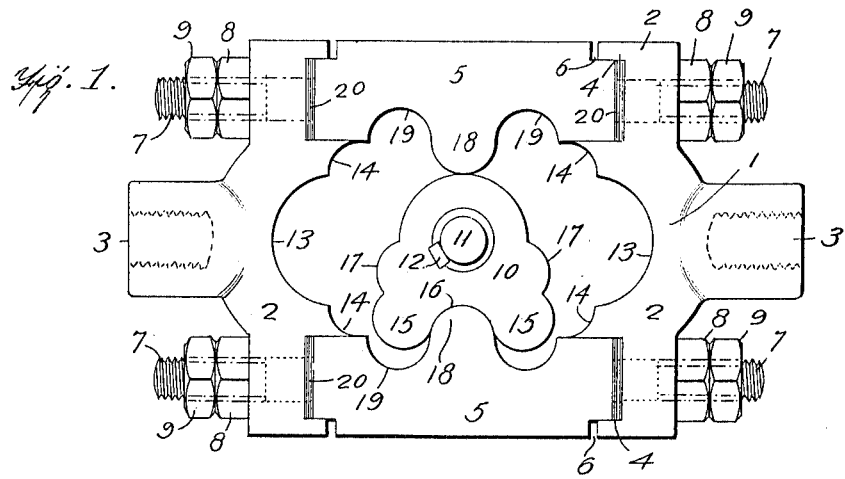
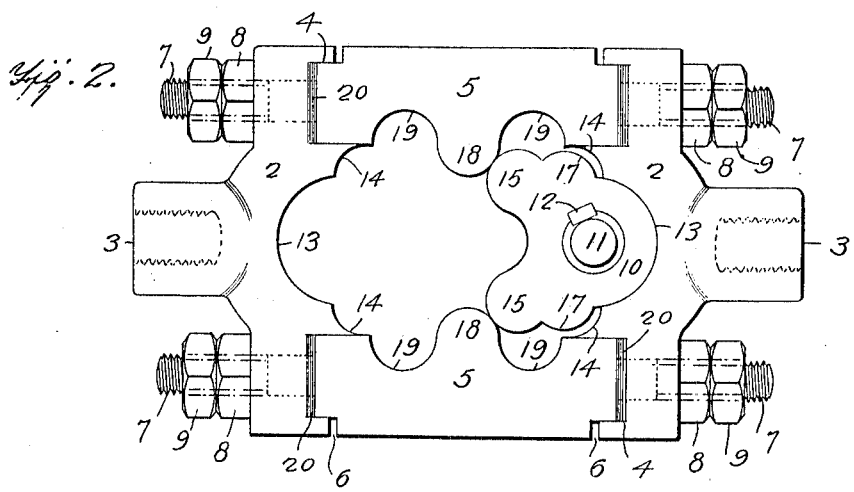
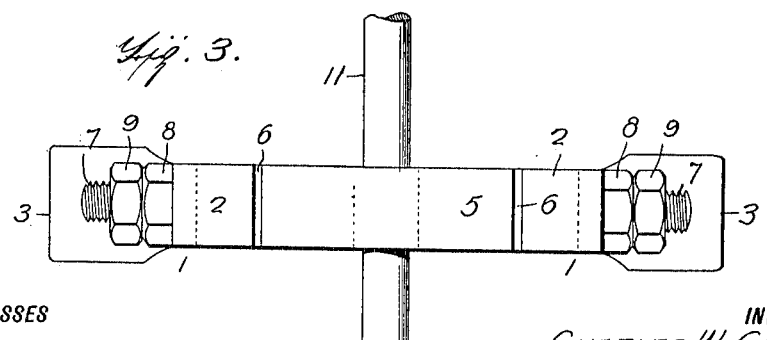
WITNESSES
INVENTOR
CHARLES W. GIFT,
BY
ATTORNEYS

UNITED STATES PATENT OFFICE.

CHARLES W. GIFT, OF WAYNESBORO, PENNSYLVANIA.

MECHANICAL MOVEMENT.

1,105,418.  Specification of Letters Patent.  Patented July 28, 1914.

Application filed May 6, 1913. Serial No. 765,817.

*To all whom it may concern:*

Be it known that I, CHARLES W. GIFT, a citizen of the United States, and a resident of Waynesboro, in the county of Franklin and State of Pennsylvania, have invented certain new and useful Improvements in Mechanical Movements, of which the following is a specification.

My invention is an improvement in mechanical movements, and has for its object, the provision of a simple inexpensive means for converting reciprocating movement into rotary movement.

In the drawings: Figures 1 and 2 are side views of the improved movement, showing the parts in different positions; and Fig. 3 is a top plan view of the same.

The present embodiment of the invention comprises a reciprocating member in the form of an open frame, and a rotating member in the form of a wheel. The frame of the reciprocating member consists of a pair of oppositely arranged cross heads each comprising a body 1 and arms 2, and the body has a central outwardly extending socket 3, for engagement by a piston rod or the like.

Each of the arms 2 has a transverse opening, and a transverse notch 4, at the inner end of the opening, and bars or slides 5 are arranged between the adjacent arms of the cross heads, the ends of each bar being received in the notches of the arms. Each of the bars has a notch 6 at each end, on its outer side, and a threaded stem 7 extends from each end of each bar, through the opening of the adjacent arm. A nut 8 and a lock nut 9 are threaded onto each stem, for securing the bars to the cross heads.

The rotating member is a pinion 10, of approximately tre-foil shape, and is secured to a shaft 11, by means of a key 12. Each of the cross heads has its inner edge, milled or cut into three recesses, one of which 13 is a semi-circle, or an arc of 180° in length, while the other recesses 14 are quarter circles or arcs of 90° in length. The pinion 10 has one half its circumference plain or blank, that is concentric with the shaft, and the other half of its circumference is cut to form two teeth 15, and a recess or notch 16, between the teeth. Between the blank or plain portion and each tooth, there is in addition a fourth or quarter tooth 17. Each of the bars 5 has its inner edge cut to form a tooth 18, fitting the recess 16, and a recess 19 on each side of the tooth.

In assembling the device, washers or liners 20 are placed on the studs 7, to secure the proper adjustment, before the cross heads are secured in place.

The piston rod is threaded into a socket 3, and is held securely and rigidly in place by any suitable means. The rod may also be rigid with the piston, since no swinging movement is necessary, the movement of the rod being a reciprocating movement in a straight line.

In operation as the reciprocating member reciprocates the pinion is turned. The teeth 15 fit the notches or recesses 19, and the tooth 18 fits the notch or recess 16. The quarter teeth 17 fit the notches or recesses 14, and the plain portion of the pinion fits the notches or recesses 13.

It will be understood that the arcs upon which the teeth 15—17 and 18 and the recesses notches or depressions 14—16 and 19 are cut are all taken upon the same circle.

I claim:

A device of the character specified, comprising a reciprocating member and a rotating member, said rotating member comprising a wheel having half its circumference concentric and having on the other half a central depression and a tooth on each side thereof, said teeth and depression being formed on semi-circular arcs of the same circle, said wheel having a tooth on the outer side of each of the first-named teeth formed on one-half the same arc, the reciprocating member comprising oppositely arranged cross heads each having an opening at each end and a central internal recess fitting the concentric portion of the wheel, and side bars connecting the adjacent ends of the cross head, each bar having a threaded stem at each end for engaging an opening of the cross head, a series of washers on each stem between the bar and the cross head, each bar having on its inner face a central tooth and lateral depression of the same size as the teeth of the wheel.

CHARLES W. GIFT.

Witnesses:
JAMES M. FORCHMAN,
CLARENCE W. BEARD.